SUBMINIATURE SEMICONDUCTOR INSTRUMENT AND METHOD AND APPARATUS FOR PRODUCING THE SAME

Filed April 25, 1955

2 Sheets-Sheet 1

INVENTOR:
Werner Holzemann

By Bryant & Lowry
ATTYS.

INVENTOR:
Werner Holzemann
By Bryant & Lowry
ATTYS.

United States Patent Office 2,856,571

Patented Oct. 14, 1958

2,856,571

SUBMINIATURE SEMICONDUCTOR INSTRUMENT AND METHOD AND APPARATUS FOR PRODUCING THE SAME

Werner Hölzemann, Kiel-Kronshagen, Germany, assignor to Kieler Howaldtswerke Aktiengesellschaft, Abt. Apparatebau, Kiel-Gaarden, Germany, a firm Application April 25, 1955, Serial No. 503,746

Claims priority, application Germany February 19, 1955

3 Claims. (Cl. 317—236)

The known semi-conductor instruments consist of diodes or transistors which are either formed by a great number of individual parts accommodated in a housing of insulating material or are embedded in plastics, but owing to the lack of expansion compensation and accurate pressure conditions during the shaping and welding, allow only a small range of temperature and, due to the exposed contact needle, a low acceleration resistance. The directional capacity in the known semi-conductor instruments embedded in plastics is very small and rational production is scarcely possible. Furthermore, their dimensions are too large for many purposes of use, such as, for example, for acceleration-proof subminiature aggregates for remote controls and the like, or for printed circuits.

One of the principal objects of the present invention is to provide an efficient method of producing subminiature semi-conductor instruments, and apparatus for carrying out that method; which method and apparatus renders possible the economical mass production of acceleration-resisting and temperature reversible subminiature semi-conductor instruments.

According to the invention the semi-conductor instruments, such as subminiature diodes, triodes, tetrodes and the like, produced have bodies about the shape of a ball approximately 2 mm. in diameter, weigh about 0.03 gr., including two projecting connection wires each 30 mm. in length, and have an acceleration resistance of 20,000 g.

According to the method of producing a semi-conductor instrument, the bent end of a connection wire about 0.25 mm. in diameter and made of a magnetic material, such as nickel, is dipped to a depth of about 2 mm. in a soft solder paste and the wire, utilising the adhesive capacity of the soft solder paste, picks up a contact needle wire about 5 mm. in length and about 0.1 mm. in diameter, to be soldered thereto. According to the necessary electric data of, e. g., a diode, the contact needle wire or cat whisker consists of chrome nickel or a precious metal alloy. The contact needle wire is then bent to the shape of a sickle or reaping hook for the expansion compensation and an end of the needle is cut off at an acute angle.

A similarly cranked extremity of another connection wire about 0.25 mm. in diameter is also dipped in soft solder paste and connected by soldering to a semi-conductor plate at the most 0.25 $mm.^3$ in size. This plate is of a size of about 0.8 x 0.8 x 0.4 $mm.^3$ and consists of, for example, germanium. Its underside is copper plated and connected to the connection wire.

The connection wire carrying the semi-conductor plate and that carrying the contact needle or cat whisker, in the case of triodes etc. there are several connection wires, are placed in a setting device in such a position that the needle point or points is or are located about 1 mm. above the middle of the semi-conductor plate, whereupon the needles with their points at right angles are pressed with a certain amount of pressure onto the surface of the semi-conductor plate. In order to fix the connection wires, the setting device is provided with clamping springs on which contacts are provided so that a short alternating current impulse can be passed through the contact needle and its point of contact with the semi-conductor plate as to enable preliminary shaping or welding, according to the material from which the semi-conductor plate and the contact needle or needles are made. The setting device is connected with a special measuring instrument with electronic characteristic curve tracer to allow accurate adjustment of the position of each contact needle on the semi-conductor plate, this adjustment being observed with the aid of a stereoscopic microscope.

The diode produced in this manner is enclosed in casting resin consisting of unsaturated polyester and polymerised. To accelerate the polymerisation infrared tubes are provided. To strengthen the fixed diode small steel wire spirals are slipped over the connection wires along the runout sections.

The fixed diode is then provided with a first layer of silicon resin which is dripped on and burnt in at a temperature of 200° to 250° C. and bonded with other layers of silicon resin and hardened, each of the additional layers being applied and hardened separately, after which a final shaping or welding, similar to the preliminary shaping, is carried out with an alternating current impulse, which however is of longer duration.

By this manner of production a semi-conductor instrument of subminiature size is produced which is proof against acceleration, operates in a large temperature range, is reversible and proof against vibration.

According to a feature of the invention, the outer layer is formed by an elastic, waterproof coating, colored to indicate the different types.

The device or apparatus for carrying out the method according to the invention consists of a soldering arrangement comprising an aluminum soldering bolt for heating the soft soldering paste and soldering, on the one hand, the contact needle to a connection wire and, on the other hand, the semi-conductor plate to another connection wire.

A needle bending machine with two clamping jaws and a shaping tool for bending the contact needle into the shape of a sickle is provided and this bending machine also has a shearing blade for chamfering the bent contact needle. An ejector on this machine ejects from the machine the finished, bent contact needle with the connecting wire.

The setting device consists of a clamping spring for gripping the connection wire with the semi-conductor plate and an adjustable, swivel and flexible clamping strap for the connection wire with the contact needle. The setting device combined with the stereoscopic microscope so as to allow accurate setting of the contact needle on the semi-conductor plate. Contact screws and contact springs on the setting device serve for connecting up the special measuring instrument with an electronic characteristic curve tracer. The alternating current impulse through the contact needle and semi-conductor plate is also conducted over these contacts.

A casting resin feeding arrangement and a polymerizing assembly with infrared tubes for the purpose of coating and drying the semi-conductor instruments also come within the scope of the invention.

Finally a silicon resin dripping device serves for applying layers on the fixed diodes and these layers are burnt in individually in a drying oven.

In order to make it possible to mass produce the semi-conductor instruments, the invention provides for the arrangement of an endless conveyor belt which carries a plurality of setting devices each mounted on a steatite plate, for the purpose of continuous setting and polymerizing. The endless conveyor belt runs past the special measuring instrument with the electronic characteristic curve tracer and in its path leads to the casting resin feeding arrangement and the infrared tubes arranged above and below the conveyor belt. The fixed diodes are then placed on a turntable which runs past the silicon resin dripping device and a drying oven several times according to the number of layers applied.

The invention also relates to semi-conductor instruments which are produced according to the above described method and are in the shape of a ball about 2 mm. in diameter with two or more connection wires about 0.25 mm. in diameter extending from the ball. At the place where the connection wires enter the ball they are each surrounded by a spiral spring and the connection wires, spiral springs and the ball have a homogeneous coating composed of several separately burnt in silicon resin layers. Within the ball a semi-conductor plate and one or more sickle-shaped contact needles connected with the plate in a certain manner are embedded in polymerized synthetic resin so that an acceleration resisting, reversible semi-conductor instrument of subminiature size is formed.

It is possible within the scope of the invention to produce diodes, triodes, tetrodes and so forth, having, instead of two connection wires or electrodes, additional electrodes, the number of which depends upon the type of the semi-conductor instrument, which electrodes lead out of the substantially spherical body.

Other objects and advantages of the invention will be apparent from the description set out below when taken in connection with the accompanying drawings, in which.

Figures 1, 2, 3, 4:
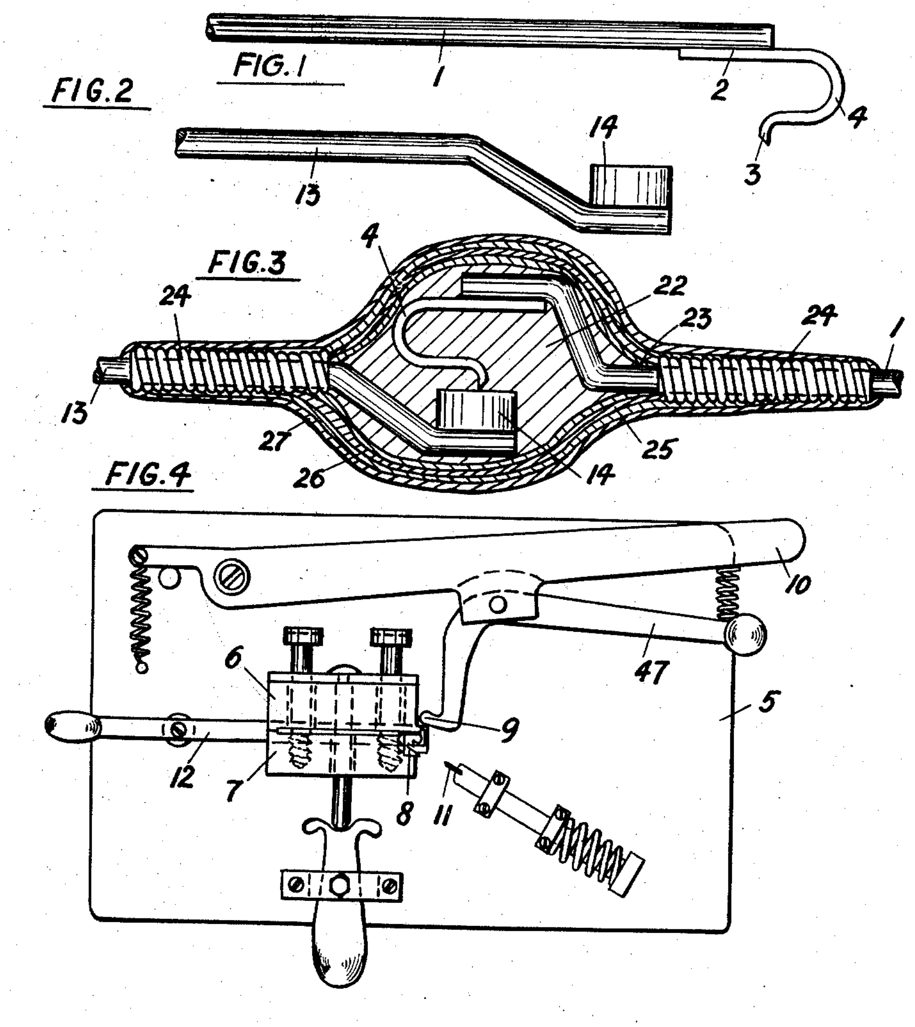
Fig. 1 shows on an enlarged scale a connection wire connected to a cat-whisker or contact needle.
Fig. 2 shows on an enlarged scale in connection wire connected to a crystal or semi-conductor plate.
Fig. 3 is a longitudinal section through a finished semi-conductor instrument shown on an enlarged scale.
Fig. 4 is a top plan view of a needle bending machine.
Figure 5:
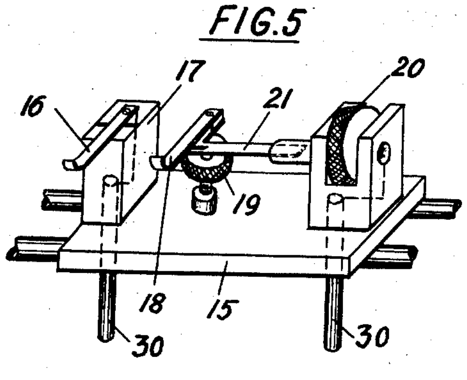
Fig. 5 is a perspective view of a setting device.
Figure 6:
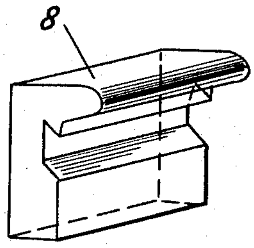
Fig. 6 is a perspective view of a shaping tool.

A connection wire 1 about 0.25 mm. in diameter made from nickel with 3% manganese is connected by a soft solder paste to a wire 2 about 5 mm. in length and 0.1 mm. in diameter, and this wire 2 is bent into the shape of a reaping hook or sickle with a chamfered point 3. The soldering is carried out in a soldering arrangement 48 (Fig. 7) and the bending of the wire 2 to form a cat-whisker or contact needle 4 is effected in a needle bending machine 5 in which the wire 1 is clamped between two jaws 6 and 7 so that the needle wire 2 projects beyond a shaping tool 8. A resilient nose 9 presses the needle wire 2 over the shaping tool 8 with the aid of levers 10, 47 and gives the wire 2 the sickle shape 4 necessary for expansion compensation. A blade 11 cuts off the needle wire at an angle at 3. The finished bent needle 4 is ejected with its connection wire 1 by an ejector 12.

Another connection wire 13 is connected at its preferably cranked end by soldering to a crystal or semi-conductor plate 14 of a maximum size of 0.25 mm.$^3$. The semi-conductor plate 14 consists, for example, of germanium and is copper plated on its underside to ensure a good solder connection.

In a setting device 15, several of which are mounted on a conveyor belt 28, the connecting wire 13 with the semi-conductor plate 14 soldered thereon is clamped under a clip spring 16 of a clamping jaw 17 provided on the left hand side of the device, so that the pre-treated upper surface of the plate faces upwards. The connection wire 1 with the cat-whisker 4 soldered thereon is clamped under a clip spring 18 of a resilient clamping strap 21 which is vertically and axially adjustable by means of adjusting wheels 19 and 20, so that the needle point 3 is located about 1 mm. above the centre of the semi-conductor plate 14.

By manipulating the adjusting wheels 19 and 20 the cat-whisker 4 is brought with its point 3 at right angles with sufficient pressure on to the surface of the semi-conductor plate 14, the operation being controlled with the aid of a stereoscopic microscope 29. The contact needle 4 is then preliminarily shaped or welded at its point to the semi-conductor plate 14 by a short alternating current impulse of a certain strength and voltage, depending upon the material of the semi-conductor plate and of the contact needle, the impulse being introduced through contact screws 30 of the setting device 15 and conducted by means of contact springs 31 to which the leads to a special measuring instrument with electronic characteristic curve tracer are connected, as is shown at 46.

The set diode, triode or the like is coated with casting resin from an unsaturated polyester and polymerized, so that a cycle of operations results consisting in the removal of a fixed diode from the setting device tuned under the microscope, setting and coating with casting resin.

The semi-conductor instrument illustrated in Fig. 3 has a filling 22 of casting resin as wrapping or coating for the cat-whisker 4 and the semi-conductor plate 14. At the places where the two connection wires 1 and 13 enter, small spirals 24 about 2 mm. in length and consisting of steel wire 0.1 mm. in diameter are slipped on to the connection wires up to the diode body so that the runout points are strengthened. The casting resin filling is surrounded by a first layer of silicon resin 23 which is burnt in at a temperature of 200° to 250° C. in a drying oven and which layer 23 already fixes the spirals 24. The spirals 24 are then additionally fixed by further separately applied and separately hardened silicon resin layers 25, 26 and 27.

When all the layers have been applied and hardened, a final shaping or welding is carried out by supplying an alternating current impulse of longer duration with a certain strength and voltage, because now, with differences in temperatures between —100° C. and +150° C., the prerequisites necessary for maintaining favorable contact conditions for a sufficient internal pressure compensation between the needle and the semi-conductor plate, in conjunction with limitation of the expansion due to contraction stresses of the surrounding, hardened silicon resin layers, are given.

To attain series or mass production, the endless conveyor belt 28 is provided with several setting devices 15. By turning a hand wheel 32 each set semi-conductor instrument is brought by means of the conveyor belt 28 under a dripping device 33 and coated with casting resin from unsaturated polyester, so that the cycle of operations described is attained, namely: removal of the fixed diode from the setting device tuned under the microscope and setting and coating with casting resin. By continually repeating this cycle of operation the setting devices are moved successively into the effective range of infrared emitters 34 located above and below the conveyor belt 28, whereby the casting resin dripped thereon is polymerized for the purpose of fixing.

Figures 7, 8, 9:
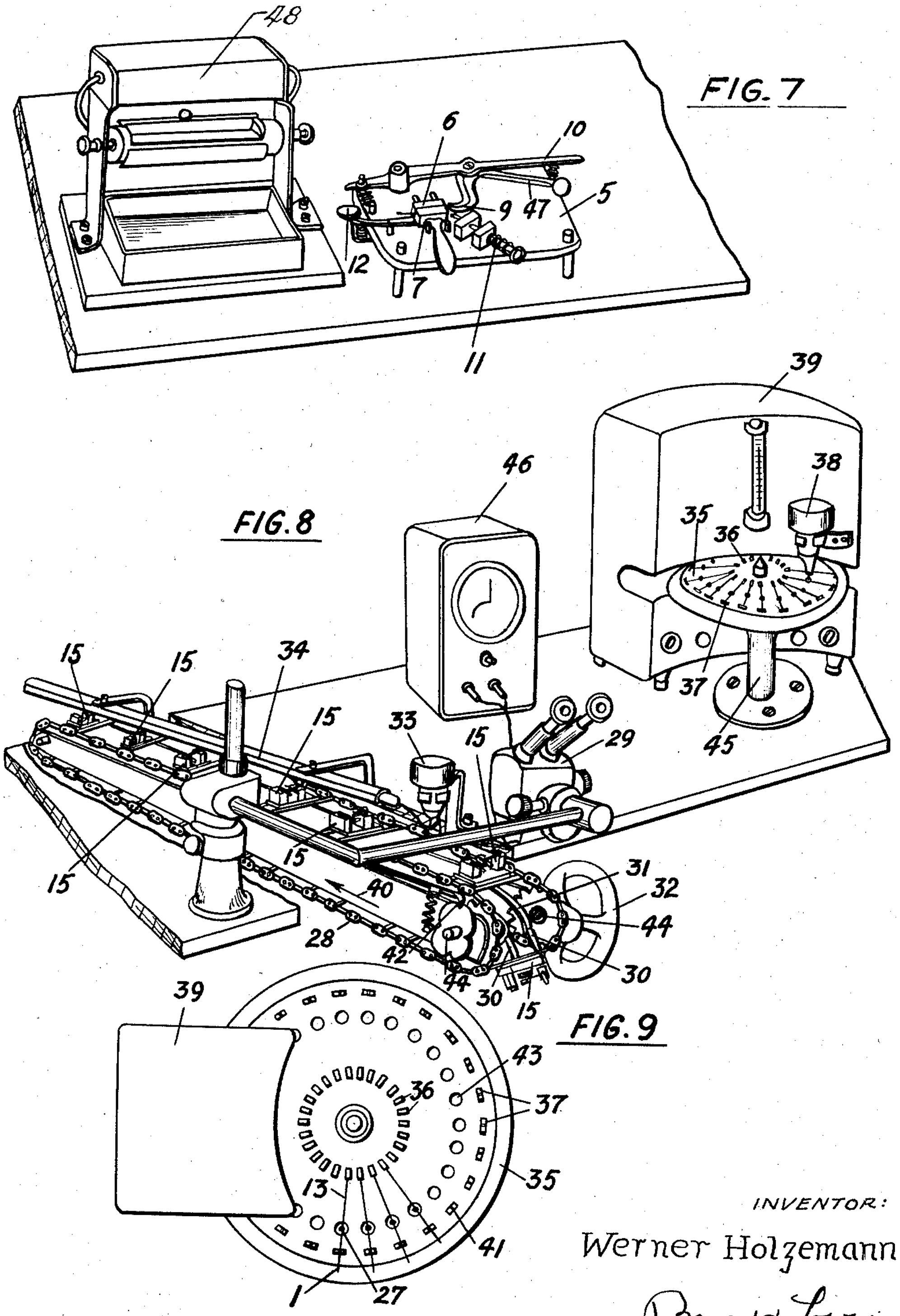
Fig. 7 is a perspective view showing a conveyor belt with setting devices and infrared emitters together with a microscope.
Fig. 8 is a perspective view.
Fig. 9 shows in top plan a turntable with dripping device and drying oven.

Fig. 8 shows the conveyor belt 28. The diode set under the microscope 29 is carried under the dripping device 33 and then brought back to the lower infrared emitters 34 in the direction indicated by an arrow 40. The arrangement may also be such that the dripping device 33 and the microscope 29 change places so that the conveyor belt 28 only carries out a working movement in the direction of the arrow 40.

On a turntable 35 mounted on a column 45 or the like a number of radially magnetized holding magnet rollers 36, 37 are mounted in pairs in such a manner that the magnet roller 36 of each pair operates in an inner circle for limiting the longitudinal position of a semi-conductor instrument and the other roller 37 of each pair operates in an outer circle on the connection wires of a semi-conductor instrument with the aid of a central notch 41 for determining the transverse position of the semi-conductor instrument which they can hold firmly. On this turntable 35 the, for example, fixed diodes are placed successively in a suitable number in ray arrangement with the spherical part over a bore 43 in the turntable. The diodes receive successively the layer 23 of silicon resin from a dripping device 38 and as the turntable continues its rotation are carried into a hardening oven 39, where this layer is hardened. After running through the oven, the three further silicon resin layers 25, 26 and 27 are applied separately to each individual diode, and hardened.

The conveyor belt 28 and the turntable 35 can be driven by synchronous motors which may be controlled by foot-operated contacts. A stop 42 acting on a conveyor belt pulley or its shaft 44 can arrest the conveyor belt in the individual operating positions.

While the method herein described, and the form of apparatus for carrying this method into effect, constitute preferred embodiments of the invention, it is to be understood that the invention is not limited to this precise method and form of apparatus, and that changes may be made in either without departing from the scope of the invention which is defined in the appended claims.

I claim:

1. As a new article of mass production a semi-conductor instrument consisting of a ball-shaped body about 2 mm. in diameter with at least two connection wires extending from said body and about 0.25 mm. in diameter, and spiral springs surrounding these connection wires at the points where they pass out of the body, the whole enclosed in a homogeneous cover formed of several separately burnt in silicon resin layers, the ball-shaped body accommodating a semi-conductor plate embedded in polymerized casting resin with at least one sickle-shaped cat-whisker connected to the plate, thereby producing an acceleration-proof, reversible, vibration-proof semi-conductor instrument of subminiature size operable in a wide temperature range.

2. A method for producing subminiature semi-conductor instruments comprised of a semi-conductor plate and at least one electrode comprised in turn of a connection wire and a contact needle connected thereto, including the steps of coating one end of the connection wire with an adhesive material, securing a contact needle to the coated end of the connection wire, fashioning the contact needle into a sickle shape, locating the free extremity of the contact needle about 1 mm. above the center of a semi-conductor plate and at right angles thereto, bringing the said free extremity of the contact needle into surface contact with the semi-conductor plate and while maintaining said contact between the needle and the semi-conductor plate passing an alternating current impulse through the needle and the plate to fix them in a set position with respect to one another and thereafter surrounding the needle and the plate with a plurality of individual layers of resinous material, heating each of layers of resinous material separately so as to cure the same and finally fixing the position of said needle with respect to said plate by passing a second current impulse of longer duration than said first impulse through said needle and said semi-conductor plate.

3. The article as set forth in claim 1 wherein said cat-whisker is of a smaller diameter than one of said connection wires, and means securing said cat-whisker to said last mentioned connection wire.

References Cited in the file of this patent

UNITED STATES PATENTS

| | | |
|---|---|---|
| 2,671,156 | Douglas et al. | Mar. 2, 1954 |
| 2,688,110 | Domaleski et al. | Aug. 31, 1954 |